United States Patent [19]

Perdue

[11] Patent Number: 4,836,877
[45] Date of Patent: Jun. 6, 1989

[54] METHOD OF MAKING A TIRE RETREADING ENVELOPE

[75] Inventor: Thad A. Perdue, Muscle Shoals, Ala.

[73] Assignee: Robbins Tire and Rubber Company, Inc., Tuscumbia, Ala.

[21] Appl. No.: 68,966

[22] Filed: Jul. 1, 1987

[51] Int. Cl.$^4$ ............................................. B29C 47/20
[52] U.S. Cl. ................... 156/244.13; 156/96; 156/122; 156/244.18; 156/304.2; 264/150; 264/209.2; 206/304
[58] Field of Search .................. 156/96, 122, 244.13, 156/244.14, 244.18, 304.2; 264/150, 209.2, 210.2; 150/54 B

[56] References Cited

U.S. PATENT DOCUMENTS

| | | | |
|---|---|---|---|
| 3,733,081 | 5/1973 | Martin | 150/54 B |
| 4,036,271 | 7/1977 | Presti | 156/382 |
| 4,116,605 | 9/1978 | Burrell | 264/209.2 |
| 4,198,367 | 4/1980 | Burrell | 156/110.1 |
| 4,328,053 | 5/1982 | Medlin | 150/54 B |

Primary Examiner—Caleb Weston
Attorney, Agent, or Firm—Klauber & Jackson

[57] ABSTRACT

A retreading envelope is produced by extruding an elastomeric material in substantially tubular form, with portions of the wall thickness of the circumference of the extruded tubing being of a thickness substantially greater than the wall thickness of the remainder of the tubing, cutting a length of the extruded tubing from the tubing as extruded, and butt-seaming the free ends of the cut length to form an annular tube substantially of circular cross-section, with the thickened wall portions of the extruded length in the area of its outer periphery. The elastomeric material in the thickened wall portions of the annular tube is then caused, e.g. by air under pressure, to flow to give the annular tube a substantially flattened outer periphery, and partially flattened side portions joining the flattened periphery with the curved body of the annular tube, so that the side portions have less curvature than said body, while curing the elastomeric material, and the inner surface of the cured annular tube is then slit.

2 Claims, 2 Drawing Sheets

METHOD OF MAKING A TIRE RETREADING ENVELOPE

FIELD OF THE INVENTION

This invention relates to tire retreading or "recapping" and is more particularly concerned with an envelope used in retreading with pre-cured treads, and with its production.

BACKGROUND OF THE INVENTION

The retreading of tires, particularly truck tires, with a pre-cured tread is a widely-practiced art. In such an operation, the tire casing to be processed is prepared by grinding or buffing off any old tread remaining on the casing. Cement is then applied and a layer of uncured cushion stock is applied to the cemented casing. A pre-cured tread layer that has had cement applied thereto is then applied over the cushion stock. Finally, the entire composite uncured retread is inserted into a protective covering or "envelope" for encasing the exterior surfaces of the uncured retread and that retread is cured. The principal purpose of the protective cover or envelope is to prevent air and/or steam used during the curing process from coming into contact with the cement and uncured cushion stock during the curing process. A further purpose of the envelope is to compress the various components described above into tight engagement with the casing so that a suitable product is produced during the curing operation. After the protective cover or envelope is placed around the composite uncured retread, the encased retread is then conventionally placed into a curing chamber or module, typically at a temperature of 200° to 325° F., in an atmosphere at a pressure of e.g. 50 to 150 pounds per square inch. Following the curing process, the encased retread is withdrawn from the curing chamber or module and the envelope is removed from it.

Over the years, several types of retread covers or envelopes have been developed for use in the above-described process. One such prior art product used in this process has been constructed from elastomeric calendar sheet. Two sheets of the material to be utilized in constructing this envelope are cut in equally-sized rings and then seamed together around their outer edges in order to produce a tire cover of the desired shape. Since the sheet goods are necessarily seamed together prior to the curing of the sheet stock, problems have arisen in producing a reliable seam along the outer edges while preventing the more interior portions of the calendar sheets from sticking to each other. The curing process mentioned in the preceding sentence, which is referred to in relation to the making of the protective tire cover or envelope, is not the same curing process which is applied (later) in producing a cure between the pre-cured tread, cement, cushion stock and tire casing during the retreading process, i.e. it is the curing process which is necessary to cure the calendar sheet itself and to produce the cured seam between layers of the sheeting prior to using the completed protective cover or envelope in retreading a tire.

There have been numerous efforts to cure the calendar sheet to satisfactorily produce a good, even circumferential seam around the outer edge while preventing the inner portions of the layers from sticking to each other. For example, it has been proposed to introduce a dry lubricant powder between the portions which are not to be joined while maintaining the seaming surfaces free from that powder so that they may be joined during the curing process. The cover is then cured in a flat configuration. This particular approach has the drawback that it tends to produce weak seams when powder is inadvertently present between the seaming surfaces. Irregular covers are produced in those instances where the inner portions of the sheeting are inadequately coated with the lubricant powder, and therefore, the layers stick to each other during the curing process. Thus, it is generally very difficult to produce a strong, precise circular seam around the outermost edge of the calendar goods to be joined. Furthermore, it has been found that cold checking occurs and air blisters which may form further reduce the durability of the contemplated product.

Presti U.S. Pat. No. 4,036,271 proposes a seamless envelope which is compression formed from an uncured elastomeric slug, using compressive forces of the order of 300 to 600 tons. The disadvantages of the seamed calendar sheets are apparently avoided but among the drawbacks of this process is the fact that heavy, expensive equipment is required.

In accordance with another proposal a butt-seamed or "spliced" tube, very similar to a tire tube, is slit along its innermost radial periphery or circumference. This particular type of cover, while generally satisfactory, does not properly conform to the outer surfaces of a composite uncured retread, and its structure, with its wholly circular cross-section, interferes with its being properly tight in the shoulder area of the tire being retreaded.

It is an object of the present invention to provide an improved retread curing envelope of the butt-seamed type which avoids the drawbacks and disadvantages of prior art proposals.

It is another object of the invention to provide a process for producing a retreading envelope of the character indicated.

It is a further object of the invention to provide a retread envelope which has increased life in comparison with butt-seamed envelopes heretofore produced.

It is still further object of the invention to provide an efficient, inexpensive process for making an improved butt-seamed retreading envelope.

BRIEF SUMMARY OF THE INVENTION

These and other objects are achieved, in accordance with the invention, by a process wherein an elastomeric material is extruded in substantially tubular form, with portions of the circumference of the extruded tubing being of a thickness substantially greater than the thickness of the remainder of the tubing. A length of the extruded tubing is cut from the elongated tubing issuing from the extruder, and its free ends are butt-seamed or spliced to form an annular tube substantially of circular cross-section when in extruded form, with the thickened portions of the extruded tubing length at its outer periphery, or perimeter while the thus-formed annular tube is provided with a valve stem. Air under pressure is introduced through the valve stem while the annular tube is in a curing mold and this causes the elastomeric material in the thickened portions of the annular form to flow to conform to the surface of the cavity of the mold which gives the annular tube a substantially flattened outer periphery, and side portions joining the flattened periphery with the normal curved body of the annular tube, which side portions have less curvature than the curved body, all while the elastomeric material is cured. The inner surface of cured annular tube is then slit to open up the annular tube and, optionally, portions of the tube body outwardly from the slit may be removed. There is thus produced a tire retreading envelope substantially conforming in cross-section to the exterior cross-section of a tire.

BRIEF DESCRIPTION OF THE DRAWINGS

The invention will now be described by reference to the accompanying drawings wherein.

DESCRIPTION OF THE PREFERRED EMBODIMENT

Figure 1:
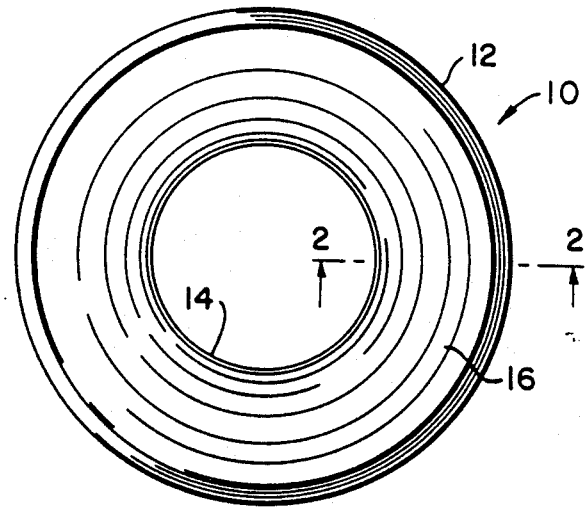
FIG. 1 is a side elevational view of a tire-retreading envelope embodying features of the present invention.
Figure 2:
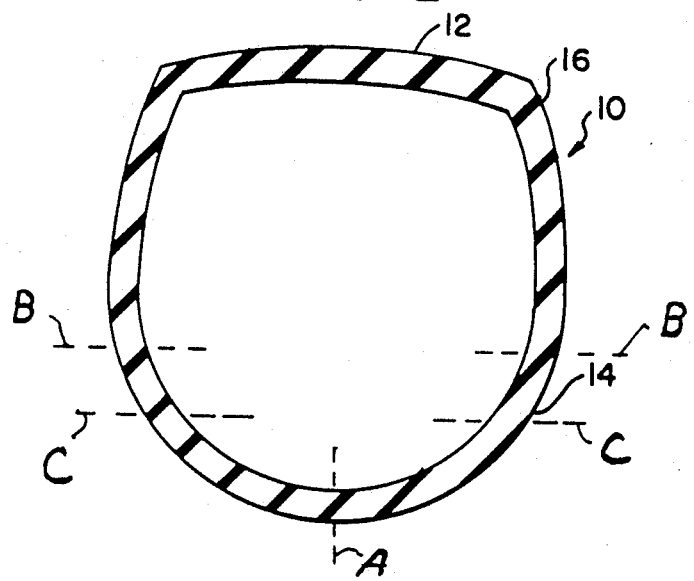
FIG. 2 is a sectional view taken approximately along the line 2—2 of FIG. 1.

Referring to the drawings and particularly to FIGS. 1 and 2, the reference numeral 10 indicates a butt-seamed tire retreading envelope in accordance with the invention. As can be seen, the envelope 10 is essentially annular in configuration and embodies a substantially planar exterior periphery 12, curved side walls 14 and a section 16 joining the peripheral portion 12 with the side walls on each side, one side not being visible but being identical to what is seen in FIG. 1. As seen particularly in FIG. 2, the side walls have a degree of curvature corresponding to that of a conventional inner tube of the same size and the intermediate or joining portions 14 have a lesser curvature, although they are not entirely flat as is the peripheral portion 12.

Figure 4:
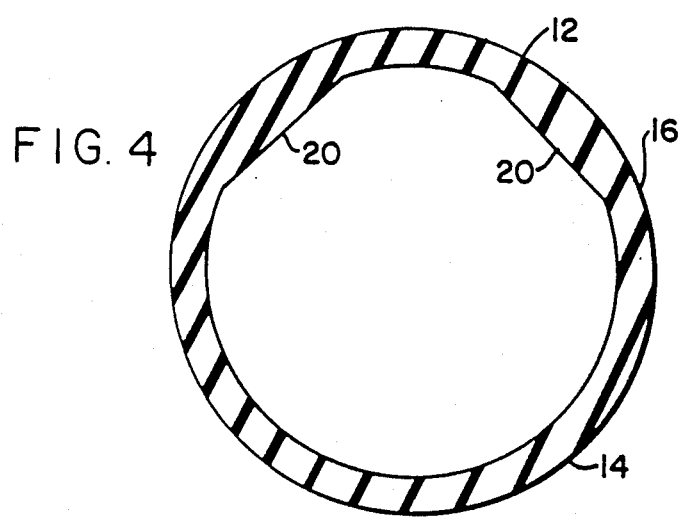
FIG. 4 is a sectional view taken approximately along the line 4—4 of FIG. 3, illustrating the thickened wall of the tubing section as extruded.

To form the envelope of the invention, an elastomeric material, such as butyl rubber, is extruded in the conventional manner in a conventional extruding machine such as that used to form inner tubes, but the extrusion die is shaped so that the extruded tubing which issues from the machine is not of uniform thickness as it is in a conventional tube-forming machine. Rather, about 50% of the extruded tube is of conventional thickness, but portions are substantially thicker e.g. 50% thicker, for reasons which will be apparent as a description proceeds. In FIG. 4, the thickened areas are seen at 20. The tubing as it issues from the extruder is passed through a water bath to cool it and, as it is cooled, it collapses. A section of the cooled extruded tubing which has a length such that it will form an annular tube of a size which will encase the sizes of the tires to be retreaded with which the envelope is to be used, is cut from the extrusion. A hole in what will be the inner periphery of the finished tube, i.e. opposite the thickened portions of the severed section is punched in it and fitted with a valve stem of conventional construction, as used in making automobile or truck tire tubes. The ends of this severed section or tubing length are then butt seamed or spliced in conventional manner.

The butt seaming is effected so that the thickened areas of the extruded tubing lie along the exterior periphery of the resulting annular tube, whereas the inner periphery is formed by the portion of the tubing section which is of conventional thickness, e.g. about ⅛ inch, the thickened areas being about 50 to 100% thicker than the remainder, e.g. up to about ¼ inch.

Figure 5:
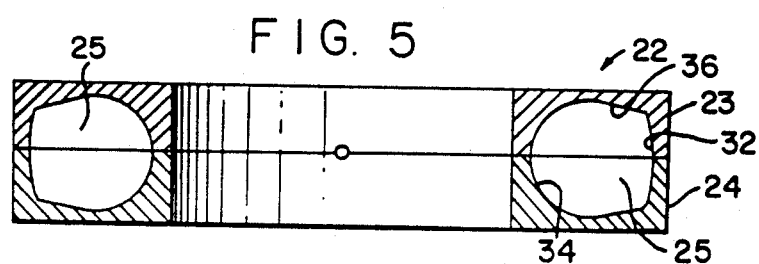
FIG. 5 is a diagrammatic sectional view of a mold for use in making a retreading envelope embodying features of the present invention.

The resulting assembly is then placed in a curing mold suitably of the type used for curing conventional automobile or truck tubes, except that the cavity of the mold is given the cross-sectional shape of the shaped retreading envelope in accordance with the invention. The mold is illustrated diagrammatically by way of a sectional view in FIG. 5. The mold body, which is adapted for use in connection with any conventional curing press, is designated by the reference numeral 22 and it is shown as having a mold halves 23 and 24 defining the mold cavity 25. As seen in FIG. 5, the mold cavity, when seen in cross-section, has a substantially linear peripheral portion 32, arcuate side and bottom portions 34 and intermediate portions 36 connecting peripheral portion 32 with side and bottom portions 34, which portions 36 are of less curvature than portions 34.

Figure 3:
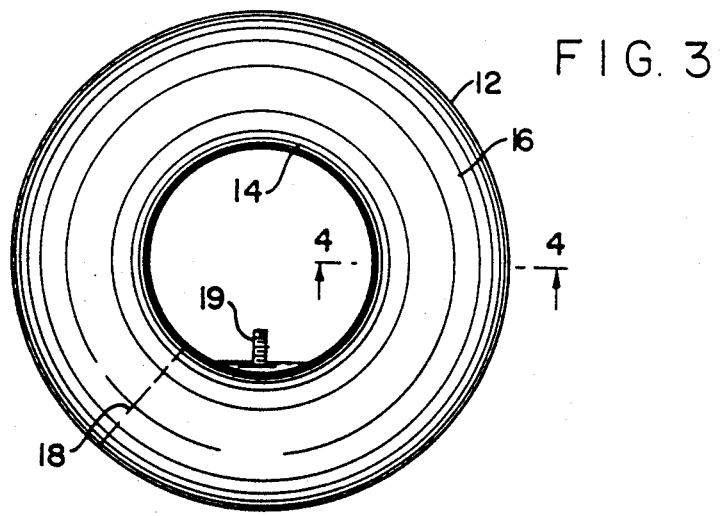
FIG. 3 is a side elevational view, similar to FIG. 1, of a section of extruded tubing in accordance with the invention which has been butt-seamed into annular form.

To form the retreading envelope of the invention, the valve stemmed-butt-seamed tubing section illustrated in FIGS. 3 and 4 is placed in the mold 22 and compressed air is fed into the annular tube through the valve stem 16 under a pressure of the order of 75 to 150 PSI. Ordinarily, a pressure of about 125 PSI is employed. The elastomeric material of the tubing is uncured at this stage and the pressure of the air will force it to conform to the interior configuration of the mold. Because of the thickened portions in the outer periphery of the tubing of the butt-seamed tubing section which has been placed in the mold, the expansion will occur evenly and a resulting annular tube will be formed which has a substantially uniform wall thickness, even though it no longer has the cross-section of the tubing section as originally extruded. The mold 22 is heated, e.g. to 250 to 350° F., e.g. for 15 to 30 minutes, to effect curing of the tubing section. The time and temperature for curing can be varied over a wide range, as is well known in the art, generally the higher the temperature, the shorter the time. After removal from the mold, the resultant shaped annular tube, which now has a cross-sectional outline conforming to that of mold cavity 25, is slit circumferentially along its inner periphery, i.e. along the line A which is seen in the cross-sectional view of FIG. 2, and the valve stem 16 removed for reuse.

Next, portions of the arcuate wall 14 extending outwardly from the slit A are cut away and removed, e.g. the portions between the slit A and the lines indicated by "B" or the lines indicated by "C" in FIG. 4. More or less may be cut away depending upon the nature of the mechanical sealing equipment with which the retreading envelope of the invention is to be used. It will be understood that, as is the practice in the retreading art, retreading envelopes are made in different sizes for use with different equipment and tires employed by purchasers. Thus, as mentioned, the amount of the side walls 14 cut away will depend upon the type of equipment with which the retreading envelope being made is to be used. It is desired that the side walls 14 of the envelope extend inwardly over the side walls of the tire sufficiently that they will be firmly gripped by the mechanism used to seal mechanically the walls of the envelope against the tire carcass being retreaded. Typical equipment of this type is well known in the art and is described, for example, in Perdue, U.S. Pat. No. 4,600,467, and in Barefoot, U.S. Pat. No. 4,274,897.

Overall, the envelope is also sized to accommodate different sizes of tires, a practice well-known in the art, just as tires are sized for different standard rims.

It has been found that the retreading envelope of the invention makes possible efficient, effective curing of the retreaded tire, that the drawbacks and disadvantages of previously available butt-seamed retreading envelopes are avoided. The envelope of the invention lies smoothly against the outer surface of the tire to facilitate curing, and a retreading envelope of the invention can be used repeatedly many times without losing any of its effectiveness.

It will, of course, be understood that various changes and modifications may be made without departing from the scope of the claims and it is intended, therefore, that all matter contained in the foregoing description and in the drawings shall be interpreted as illustrative only and in no way as limitative of the invention.

I claim:

1. A process which comprises extruding an elastomeric material in substantially tubular form of circular cross-section and having a curved circumference with portions of the curved circumference of the extruded tubing having a wall thickness substantially greater than the wall thickness of the remainder of the tubing, cutting a length of the extruded tubing from the tubing as extruded, butt-seaming the free ends of said length to form an annular tube substantially of circular cross-section, with the thickened wall portions of the extruded length in the area of its outer periphery, causing the elastomeric material in the thickened portions of the annular tube to flow under heat and pressure to give the annular tube a substantially flattened outer periphery, and partially flattened side portions joining the flattened periphery with the curved body of the annular tube, with the side portions having less curvature than said body, while curing said elastomeric material, and slitting the inner surface of the cured annular tube.

2. A process which comprises extruding an elastomeric material in substantially tubular form of circular cross-section, and having a curved circumference with portions of the curved circumference of the extruded tubing having a wall thickness substantially greater than the wall thickness of the remainder of the tubing, cutting a length of the extruded tubing from the tubing as extruded, butt-seaming the free ends of said length to form an annular tube substantially of circular cross-section, with the thickened wall portions of the extruded length in the area of its outer periphery, while providing the thus-formed annular tube with a valve stem, introducing air under pressure through this valve stem while the annular tube is in a curing mold to cause the elastomeric material in the thickened portions of the annular tube to flow to give the annular tube a substantially flattened outer periphery, and partially flattened side portions joining the flattened periphery with the curved body of the annular tube, with the side portions having less curvature than said body, while curing said elastomeric material, slitting the inner surface of the cured annular tube, and selectively removing portions of the tube body circumferentially outwardly from the slit.

* * * * *